(12) United States Patent
Kwon

(10) Patent No.: US 7,835,894 B2
(45) Date of Patent: Nov. 16, 2010

(54) SYSTEM AND METHOD FOR SIMULATING HOME NETWORK

(75) Inventor: O-shik Kwon, Seoul (KR)

(73) Assignee: Samsung Electronics Co., Ltd., Suwon-so (KR)

( * ) Notice: Subject to any disclaimer, the term of this patent is extended or adjusted under 35 U.S.C. 154(b) by 860 days.

(21) Appl. No.: 11/606,142

(22) Filed: Nov. 30, 2006

(65) Prior Publication Data
US 2007/0168489 A1 Jul. 19, 2007

(30) Foreign Application Priority Data
Jan. 10, 2006 (KR) .................... 10-2006-0002860

(51) Int. Cl.
*G06G 7/48* (2006.01)
(52) U.S. Cl. ........................... 703/6; 709/223
(58) Field of Classification Search ................ 703/1, 703/2, 6, 13, 14, 20, 21; 709/223, 224; 702/122
See application file for complete search history.

(56) References Cited

U.S. PATENT DOCUMENTS

| | | | |
|---|---|---|---|
| 6,563,503 B1* | 5/2003 | Comair et al. | 345/473 |
| 6,937,972 B1* | 8/2005 | Van Ee | 703/20 |
| 7,484,008 B1* | 1/2009 | Gelvin et al. | 709/249 |
| 2006/0238503 A1* | 10/2006 | Smith et al. | 345/156 |
| 2006/0265494 A1* | 11/2006 | Kwon et al. | 709/224 |

FOREIGN PATENT DOCUMENTS

| | | |
|---|---|---|
| JP | 9-134341 A | 5/1997 |
| KR | 10-2004-0104339 A | 12/2004 |
| KR | 10-0470916 B1 | 1/2005 |
| KR | 10-2005-0056016 A | 6/2005 |
| WO | 2005109906 A2 | 11/2005 |

* cited by examiner

*Primary Examiner*—Russell Frejd
(74) *Attorney, Agent, or Firm*—Sughrue Mion, PLLC

(57) ABSTRACT

A system and method are provided for simulating a home network, in which elements of the home network are implemented by software even before the home network is equipped with all necessary elements, so that a user can simulate the home network through a graphical user interface. The system includes: a client having a graphical user interface through which a user inputs a control message which controls a device and recognizes a response message to the input control message; and a server transmitting a device entity corresponding to the input control message, and selectively transmits multiple response messages to the client in response to the received control message.

20 Claims, 7 Drawing Sheets

FIG. 5

```xml
<?xml version="1.0" encoding="UTF-8" ?>
   <reaction xmlns:xsi="http://www.w3.org/2001/XMLSchema-instance"
      xsl:noNamespaceSchenaLocation="reation_rule,xsd" >
   <rule priority="1" >
      <input key="PT" value="RequestStatus" />
      <output key="PT" value="Status" />
      <output key="Light1On" value="true" />
   </rule>
   <rule priority="1" >
      <input key="PT" value="RequestStatus" />
      <output key="PT" value="Status" />
      <output key="Light1On" value="false" />
   </rule>
</reaction>
```

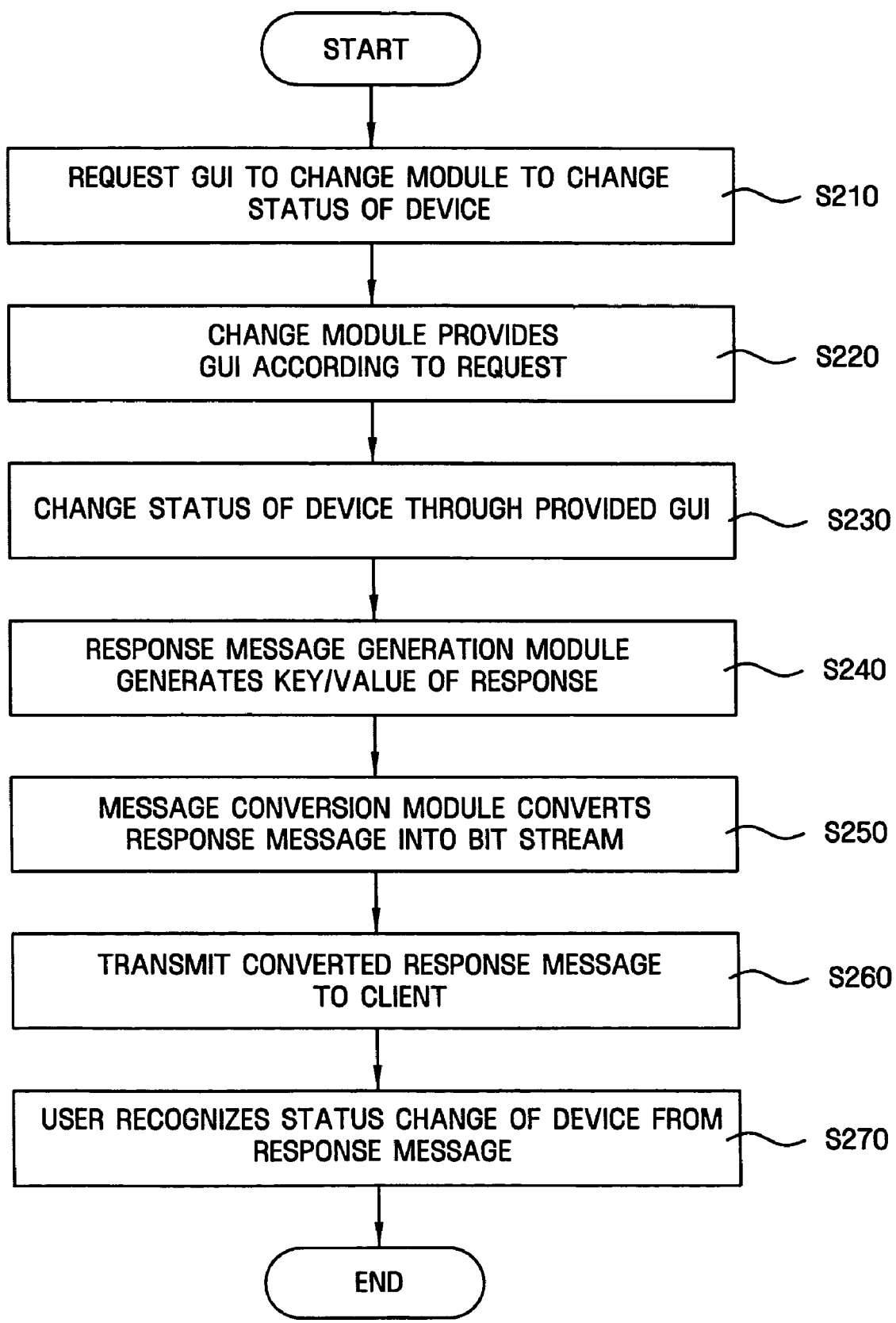

| | CONTROL MESSAGE (210) | RESPONSE MESSAGE (220) |
|---|---|---|
| MESSAGE START | 02 | 02 |
| DEVICE TYPE | 53 | 53 |
| PROTOCOL TYPE | 01 | 01 |
| MESSAGE TYPE | 00 | 00 |
| MODE | 00 | 00 |
| MESSAGE | 00003030303030303030303030303030 | 00020105303001302830303030303030 |
| CHECKSUM | 50 | 50 |
| MESSAGE END | 00 | 00 |

SYSTEM AND METHOD FOR SIMULATING HOME NETWORK

CROSS-REFERENCE TO RELATED APPLICATION

This application claims priority from Korean Patent Application No. 10-2006-0002860 filed on Jan. 10, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to simulating a home network, and more particularly, to a system and method for simulating a home network, by which it is possible to simulate the home network even before the home network is equipped with all necessary elements for development of the home network.

2. Description of the Related Art

A home network interconnects electronic devices within a house through the network, thereby enabling communication between users, between devices, and between a user and a device. Using the home network, it is possible to easily control the electronic devices within a house without being restricted by the space or device, and it is possible to benefit from a wider variety of services. Therefore, the home network technology is a technology that improves the quality of life.

When the home network is utilized, a remote user can perform remote control of home electronic devices, for example, a remote user can view the inside of a house, control illumination, or turn on an air-conditioner through a wireless terminal and Internet, and safety may be guaranteed by up-to-date crime/accident prevention systems.

FIG. 1 is a block diagram of a typical home network system.

As shown in FIG. 1, the typical home network system 10 includes a client 11 through which a user inputs a control message for controlling an electronic device (hereinafter, referred to as "device"), a local area control server 12 for controlling an area in which the device to be controlled by the user is located, and a gateway 13 connected to a house in which the device to be controlled by the user is located so that the gateway 13 transfers the control message from the local area control server 12 to the gateway 13.

The client 11 refers to a wireless terminal or computer connected to the Internet, which provides a graphical user interface (GUI) through which a user can input a control message for controlling the device. The local area control server 12 generally controls the area (including apartment complex, residential streets, etc.) in which the device to be controlled by the user is located.

The client 11 transfers a control message input by the user to the local area control server 12, and the local area control server 12 then transfers the control message to the gateway 13 connected to a house in which the device to be controlled by the user is located. Further, the gateway 13 analyzes the transferred control message when transferring the control message.

As described above, in order for a user to control a device, it is necessary to have equipped not only all the elements 11, 12, and 13 of the home network system 10 as shown in FIG. 1 but also the device.

However, the model and standard of the devices are being constantly developed and modified and, thus, it is very difficult to use a newly developed or modified device in an actual test or simulation of a graphical user interface when the newly developed or modified device is introduced.

Korean Laid-Open Patent No. 2005-0015882 discloses an apparatus and method for the remote control of a home device through a home network, which can automatically update environmental setup data when a new device is added to the home network or the environmental setup data of an existing device is modified. However, the disclosed apparatus and method can be achieved only when the home network is equipped with all the necessary elements.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. The present invention is to provide a system and method for simulating a home network, in which elements of the home network are implemented by software even before the home network is equipped with all necessary elements, so that a user can simulate the home network through a graphical user interface.

According to an aspect of the present invention, there is provided a system for simulating a home network, the system including: a client having a graphical user interface through which a user inputs a control message for controlling a device and recognizes a response message to the input control message; and a server transmitting a device entity corresponding to the input control message, and selectively transmitting multiple response messages to the client in response to the received control message.

According to another aspect of the present invention, there is provided a method for simulating a home network, the method including: inputting by a user a control message for controlling a device through a graphical user interface provided by a first device; transmitting the input control message to a second device; transmitting the control message from the second device to a device entity corresponding to the input control message and selectively generating multiple response messages corresponding to the transmitted control message; and transmitting the generated response messages to the first device.

BRIEF DESCRIPTION OF THE DRAWINGS

The above and other aspects and features of the present invention will be more apparent from the following detailed description of exemplary embodiments taken in conjunction with the accompanying drawings, in which:

FIG. 5 illustrates a generation rule according to an exemplary embodiment of the present invention;

FIG. 6 is a flowchart of a process for changing a status of a device through a graphical user interface provided by the change module 123e according to an exemplary embodiment of the present invention;

DETAILED DESCRIPTION OF THE EXEMPLARY EMBODIMENTS

Figure 1:
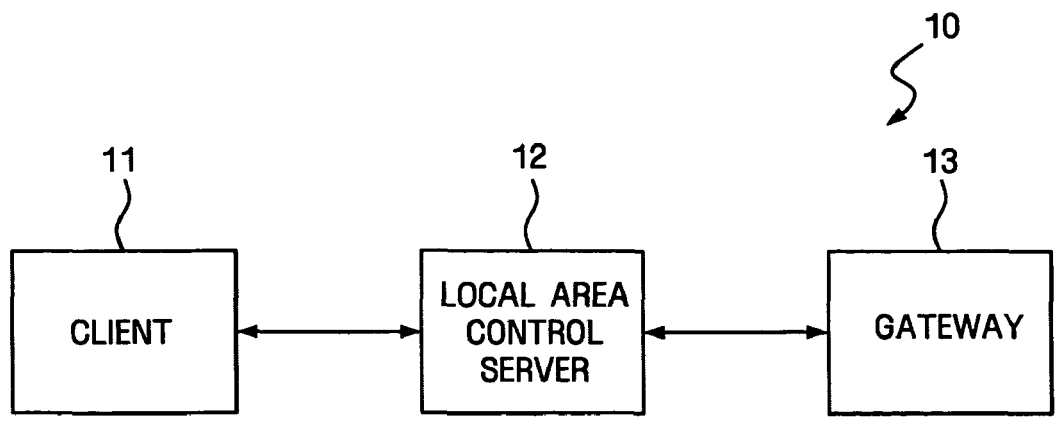
FIG. 1 is a block diagram of a typical home network system.

The various aspects and features of the present invention, and ways to achieve them will be apparent from the exemplary embodiments of the present invention as will be described below together with the accompanying drawings. However, the scope of the present invention is not limited to these exemplary embodiments and the present invention may be realized in various forms. The exemplary embodiments to be described below are provided to convey the concept of the present invention and assist those skilled in the art to understand the present invention. The present invention is defined by the scope of the appended claims. Also, the same reference numerals are used to designate the same elements throughout the specification.

The exemplary embodiments of the present invention are described hereinafter with reference to block diagrams or flowcharts for illustrating systems and methods for simulating a home network.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 2:
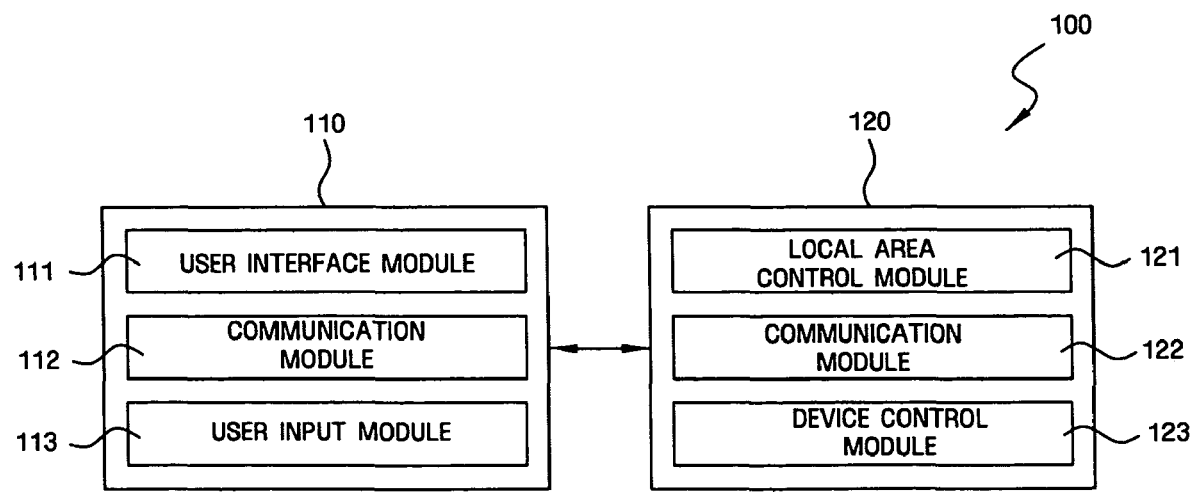
FIG. 2 is a block diagram of a home network simulation system according to an exemplary embodiment of the present invention.

FIG. 2 is a block diagram of a home network simulation system according to an exemplary embodiment of the present invention.

As shown, the home network simulation system 100 according to an exemplary embodiment of the present invention includes a client 110 having a graphical user interface through which a user inputs a control message for controlling a device and recognizes a response message to the input control message, and a server 120 for receiving the input control message and selectively transmitting a plurality of response messages to the client 110 in response to the received control message. The following description is based on an example in which the elements of the client 110 and the server 120 are implemented by software.

The client 110 includes a user interface module 111 for providing the graphical user interface through which the user can input the control message and recognize the response message to the input control message, a communication module 112 for transferring the control message input by the user to the server 120 and receiving the response message from the server 120, and a user input module 113 for receiving the control message input from the user.

The user may input a key and a value provided by the graphical user interface module 111, which indicate a function of a device and the status of the key, respectively. For example, when the device to be controlled by the user is a washing machine, the key may indicate "power" and the value may indicate "on/off." Therefore, the user can input a control message to turn on the power of the washing machine through the graphical user interface. Further, the user can recognize a response message to the input control message on the graphical user interface provided by the user interface module 111. The terms "key" and "value" used herein are just an example used in order to aid understanding of the present invention and may be changed to represent any other form of input.

The communication module 112 transfers the control message input by the user to the server 120. At this time the control message may be transferred to the server 120 after being converted to a bit stream. According to the present exemplary embodiment, the control message is converted to a bit stream by the communication module 112. However, the present invention is not limited thereto, and the control message may be converted to a bit stream by another element.

The server 120 includes a local area control module 121 for controlling the area in which the device to be controlled by the user is located, a communication module 122 connected between the local area control module 121 and the device to be controlled by the user so as to transfer the control message from the client 110 to the corresponding device, and a device control module 123 for generating a response message to the control message from the client 110 and transmitting the generated response message to the client 110.

The client 110 may transmit the control message input by the user through the Internet or a network to the local area control module 121 controlling the area in which the device to be controlled by the user is located. Then, the local area control module 121 analyzes the control message and transmits the control message to the communication module 122 connected to the device to be controlled by the user based on a result of the analysis.

The communication module 122 analyzes the control message from the local area control module 121 and transmits the control message to the device to be controlled by the user.

Figure 3:
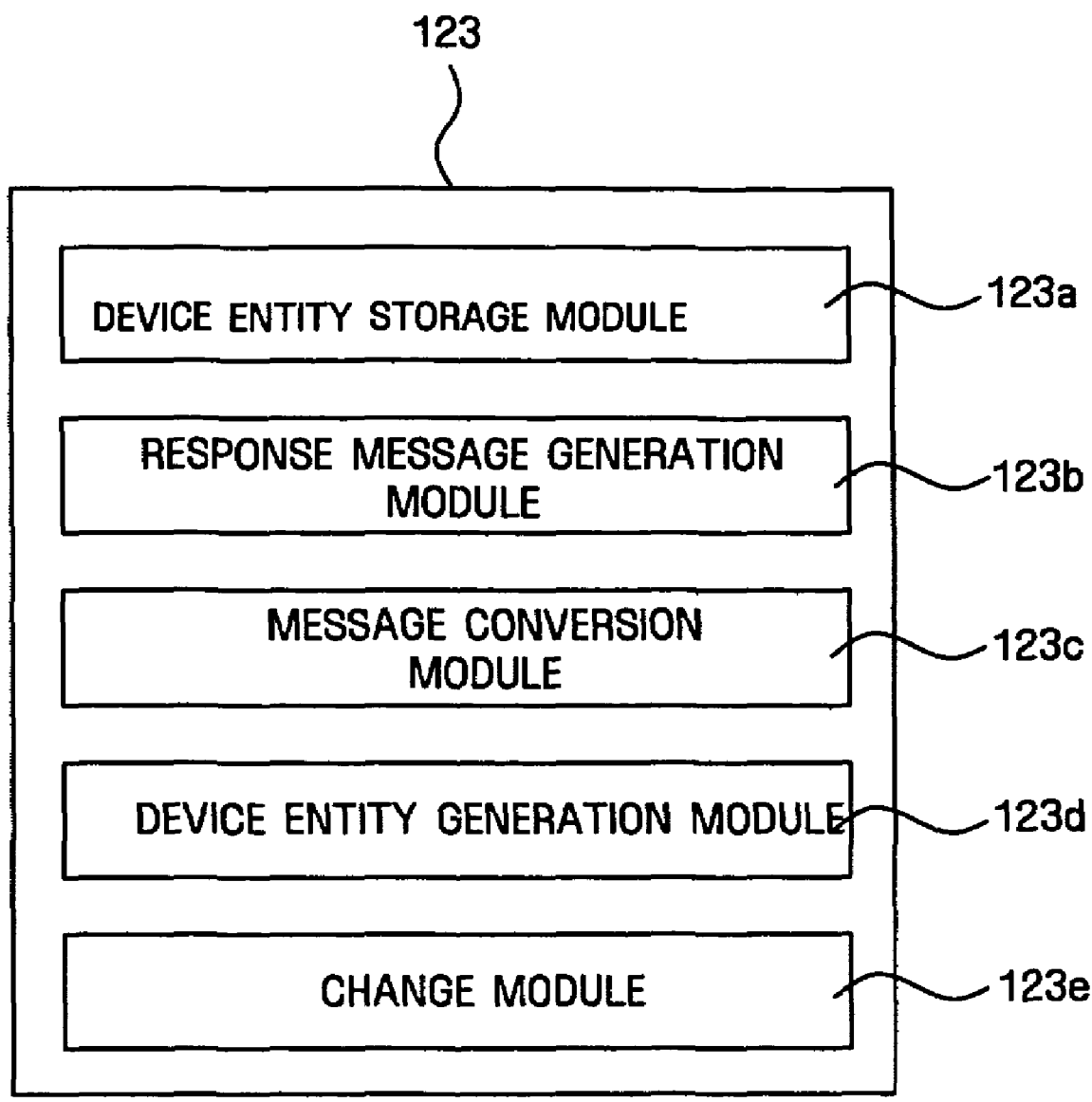
FIG. 3 is a block diagram of a device control module according to an exemplary embodiment of the present invention.

As shown in FIG. 3, the device control module 123 includes a device entity storage module 123a for storing device entities corresponding to devices, a response message generation module 123b for selecting a device entity corresponding to the control message transmitted from the communication module 122 from among the stored device entities and generating a response message based on the selected device entity, a message conversion module 123c for converting the message transmitted between the client 110 and the server 120, a device entity generation module 123d for generating a device entity based on the received control message when the device entity corresponding to the received control message is not stored in the device entity storage module 123a, and a change module 123e for providing a graphical user interface through which a user can change the key and value of a device.

The device entity stored in the device entity storage module 123a may correspond to a device class for a device. According to the present exemplary embodiment, the device entity is made in a Markup language, such as Hyper Text Markup Language (HTML) or eXtensible Markup Language (XML).

The response message generation module 123b generates a key/value pair of a response message corresponding to a key/value pair of the transmitted message. The key/value pair of the generated response message is different according to the device entity of the device to be controlled by the user. The key/value of the response message generated according to each device entity may be either predetermined, added deleted or changed by the user.

Further, the response message generation module 123b may generate multiple key/value pairs of multiple response messages corresponding to a key/value pair of the transmitted message. In this case, the response message generation module 123b may selectively generate the multiple key/value pairs according to priorities given to the multiple key/value pairs. For example, when the key/value pair of the transmitted message is "power/on," the key/value pairs generated by the response message generation module 123b may include "power/on" and "power/off," and the response message generation module 123b can selectively generate the multiple key/value pairs according to priorities (for example, probability) given to the multiple key/value pairs.

Therefore, the user can recognize various response messages for the input control message. As a result, the user can input a control message and recognize various response messages to the control message as well as a predetermined response message through the client 110. Therefore, it is possible to test a wider variety of conditions by simulation through the graphical user interface.

The control message transmitted through the Internet or a network from the client 110 may include a bit stream and the response message transmitted from the server 120 to the client 110 also may include a bit stream. However, the control message input through the client 110 by the user or the response message generated in the response message generation module 123b includes a key/value pair. Therefore, the message conversion module 123c converts the control message transmitted from the client 110 into a key/value pair and converts a key/value pair of the generated response message into a bit stream.

When the user inputs a control message for a newly added device, the response message generation module 123b cannot find a device entity corresponding to the added device in the device entity storage module 123a. Then, the device entity generation module 123d generates a device entity for the new device according to a generation rule. The generation rule defines a key/value pair of a response message corresponding to a key/value pair of a control message input by the user, so that the device entity generation module 123d can generate a device entity of a device according to the generation rule. Further, the device entity generated by the device entity generation module 123d is stored in the device entity storage module 123a, so that the response message generation module 123b can generate a key/value pair of a response message based on the stored device entity when the user inputs a control message for the device corresponding to the stored device entity.

Even when there is no control message transmitted from the client 110, the change module 123e can provide a graphical user interface through which the user can change the status of a device entity. Therefore, the user can recognize a response message for a device even without inputting a control message through the client 110 and can do various tests through the graphical user interface provided by the client 110.

Figure 4:
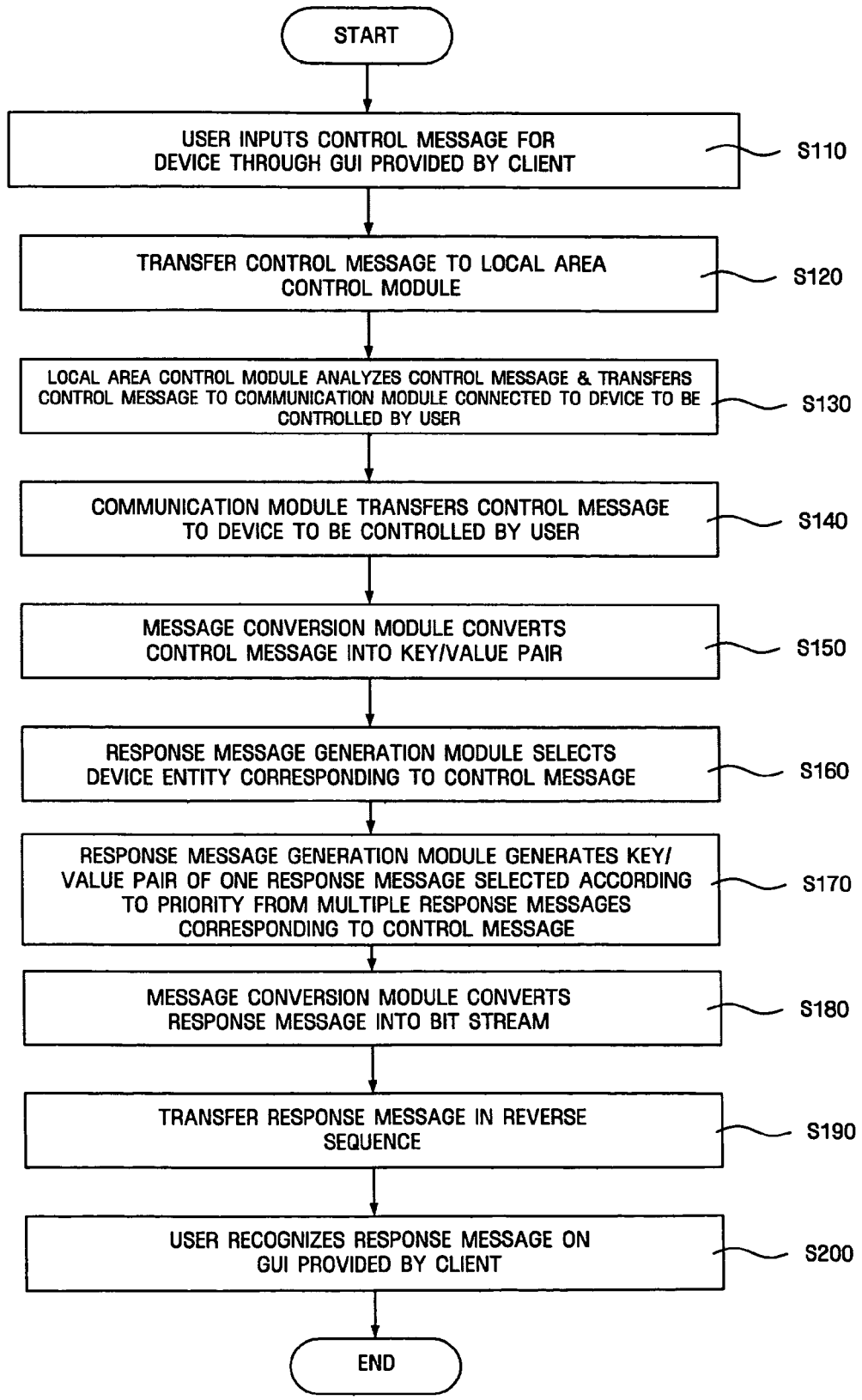
FIG. 4 is a flowchart of a method for simulating a home network according to an exemplary embodiment of the present invention.

FIG. 4 is a flowchart of a method for simulating a home network according to an exemplary embodiment of the present invention.

In the method for simulating a home network according to an exemplary embodiment, a user inputs a control message through a graphical user interface provided by the user interface module 111 of the client 110 (operation S110). The input message may include a key/value pair for a device.

The control message input by the user is transmitted through the communication module 112 to the local area control module 121 controlling the area in which the device to be controlled by the user is located (operation S120).

The local area control module 121 analyzes the received control message and transfers the control message to the communication module 122 connected to the device to be controlled by the user (operation S130).

The communication module 122 transmits the control message to the device to be controlled by the user (operation S140), and the message conversion module 123c converts the control message from a bit stream into a key/value pair (operation S150).

The response message generation module 123b selects a device entity corresponding to the key/value pair of the converted control message from the device entity storage module 123a (operation S160), and generates a key/value pair of a response message selected according to the priorities given to the response messages based on the selected device entity (operation S170). When the device entity corresponding to the received control message is not stored in the device entity storage module 123a, the response message generation module 123b can generate the device entity according to the above-mentioned generation rule.

Specifically, the response message generation module 123b can generate a key/value pair of a response message corresponding to the control message according to the generation rule. As shown in FIG. 5, the response message generation module 123b may have multiple generation rules according to the priorities. The present exemplary embodiment shows an example in which the response message has two key/value pairs. However, the present invention is not limited to this example. When each of the two key/value pairs has a priority of 1, it implies that each of the two key/value pairs is generated with a probability of 50%. When the two key/value pairs have priorities of 1 and 3, respectively, it implies that the two key/value pairs are generated with a probability of 25% and a probability of 75%, respectively.

The message conversion module 123c converts the generated response message back into a predetermined bit stream (operation S180), and the converted response message is transmitted to the client 110 in a reverse sequence (operation S190).

Then, the user can recognize the response message transmitted to the client 110 through a graphical user interface provided by the user interface module 111 (operation S200).

FIG. 6 is a flowchart of a process for changing a status of a device through a graphical user interface provided by the change module 123e according to an embodiment of the present invention.

In a process for changing a status of a device according to an exemplary embodiment of the present invention, a user requests a graphical user interface from the change module 123e in order to change a status of a device (operation S210), and the change module 123e provides a graphical user interface according to the request (operation S220).

Figures 7, 8:
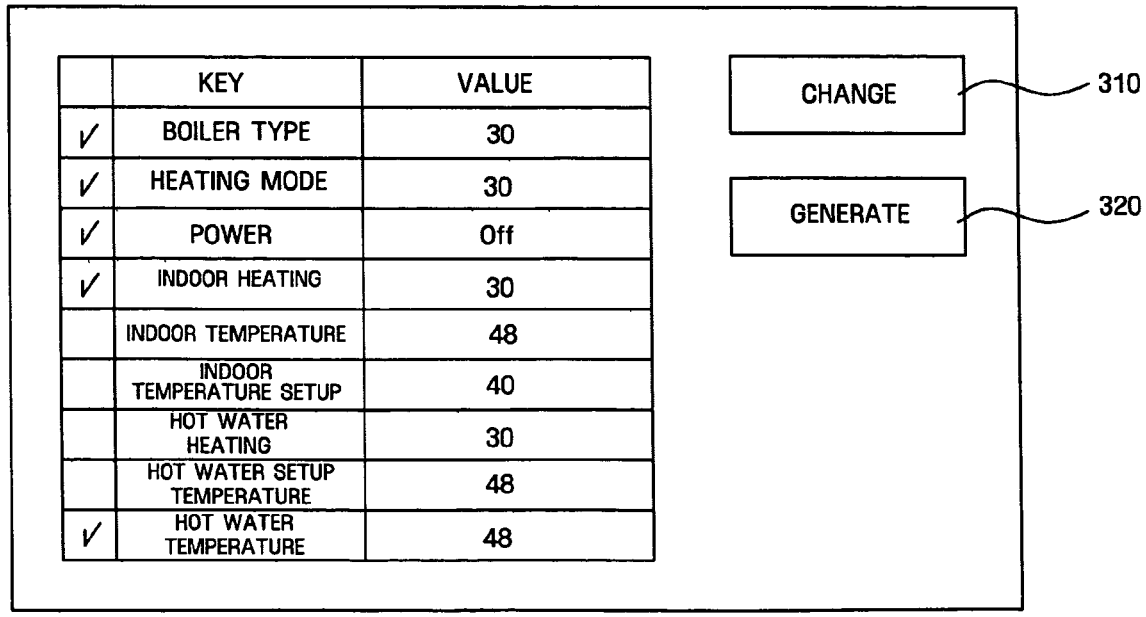
FIG. 7 illustrates a graphical user interface provided for changing the status of the device according to an exemplary embodiment of the present invention.
FIG. 8 illustrates a graphical user interface including the key and the value for the device of FIG. 7.
Figure 9:
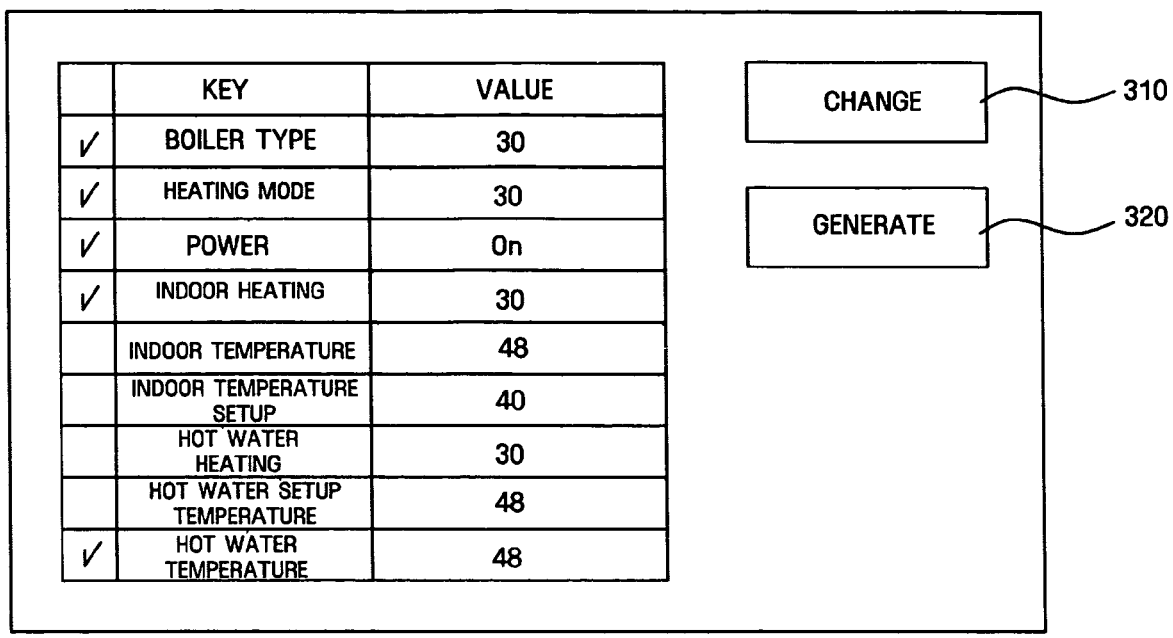
FIG. 9 illustrates a graphical user interface with a value changed from that of FIG. 8.

Then, the graphical user interface provided by the change module 123e may include a control message transmitted from the client 110 to the server 120 and a response message transmitted from the server 120 to the client 110 as shown in FIG. 7. Further, the response message in the graphical user interface shown in FIG. 7 may include a change button 310 for changing a key and value of a device and a generation button 320 for generating a response message according to the changed key and value, as shown in FIGS. 8 and 9. However, the present invention is not limited thereto, and the response message generation module 123b may automatically generate a response message when the key and value of the device is changed.

Then, the user can change the status of the device by changing the data item indicating the key/value of the device in the response message 220 on the provided graphical user interface (operation S230).

For example, when the user double-clicks the data item of the response message 220 on the provided graphical user interface shown in FIG. 7, a graphical user interface as shown in FIG. 8 is additionally provided. Then, the user can select a key and value for a device on the graphical user interface of FIG. 8. The graphical user interface of FIG. 8 shows selection of the key and value when the device is a boiler.

When the user has changed the status of the device through the graphical user interfaces of FIGS. 7 and 8, the response message generation module 123b generates a key/value pair of a response message indicating the change in the status of the device (operation S240).

For example, in the status shown in FIG. 8, items of power, heating, and hot water in the menu of the key have been checked, and the value for the power item is "off." Then, if the user changes the value for the power item into "on," the response message generation module 123b can generate "power/on" that is the changed key/value pair.

The message conversion module 123c converts the generated response message into a bit stream (operation S250), and the generated response message is transmitted to the client 110 according to a process inverse to the process in which the control message is transmitted (operation S260).

Then, the user can recognize from the response message transmitted to the client 110 that the status of the device has been changed (operation S270).

As used herein, the "unit" or "module" refers to a software element or a hardware element, such as a Field Programmable Gate Array (FPGA) or an Application Specific Integrated Circuit (ASIC), which performs a predetermined function. However, the unit or module does not always have a meaning limited to software or hardware. The module may be constructed either to be stored in an addressable storage medium or to execute one or more processors. Therefore, the module includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the modules may be either combined into a smaller number of elements or modules or divided into a larger number of elements or modules.

The system and method for simulating a home network according to the exemplary embodiments of the present invention as described above may provide the following advantages.

It is possible to easily test a home network even before the home network is equipped with all necessary elements for construction of the home network. Further, when a new element is added to the home network, it is possible to test various device models and standards through generation of a device entity.

Further, in addition to a message, various response messages are generated according to priorities given to the messages for use in a graphical user interface test. Moreover, when a status of a device is changed in the server, the server generates a corresponding response message. Therefore, it is possible to test the graphical user interface under various conditions.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A system for simulating a home network, the system comprising:
    a client which generates an input control message for controlling a device and receives a response message to the input control message; and
    a server which analyzes the input control message, and transmits a response message, selected from among generated multiple response messages, to the client in response to the received control message,
    wherein the server comprises a device control module which generates the multiple response messages according to priorities given to the response messages and selects the one of the response messages from among the multiple response messages according to priorities given to the multiple response messages.

2. The system of claim 1, wherein the client includes a graphical user interface through which a user inputs the input control message.

3. The system of claim 2, wherein the server further comprises:
    a local area control module which controls an area in which the device to be controlled by a user is located; and
    a communication module which is communicably connected between the local area control module and the device to be controlled by the user so as to transfer the control message from the client to a corresponding device entity.

4. The system of claim 3, wherein the device control module comprises:
    a device entity storage module which stores device entities corresponding to the devices;
    a response message generation module which selects a device entity corresponding to the input control message from among the stored device entities and generates a response message based on the selected device entity which is selected;
    a message conversion module which converts messages transmitted between the client and the server.

5. The system of claim 4, wherein the device entity is a device class made in a Markup language based on information of a device.

6. The system of claim 4, wherein the message conversion module converts the control message transmitted from the client from a bit stream into a key/value pair including a key and a value, wherein the key indicates a function of the device and the value indicates a status of the function.

7. The system of claim 6, wherein the response message generation module generates a response message including the key/value pair corresponding to the control message.

8. The system of claim 7, wherein the message conversion module converts the generated response message into a bit stream.

9. The system of claim 6, wherein the device control module further comprises:
 a device entity generation module which generates a device entity based on the control message if the device entity corresponding to the control message is not stored in the device entity storage module; and
 a change module which provides a graphical user interface through which a user can change the key and the value of a device.

10. The system of claim 9, wherein the device entity generation module generates a new device entity through the key/value pair of the response message corresponding to the key/value pair of the control message and stores the generated device entity in the device entity storage module.

11. The system of claim 9, wherein, when the key and the value of a device are changed, the device control module transmits a response message including a changed key and a changed value to the client.

12. A method for simulating a home network, the method comprising:
 inputting a control message which controls a controlled device through a user interface provided by a first device;
 transmitting the input control message to a second device;
 transmitting the control message from the second device to a device entity corresponding to the input control message and generating multiple response messages corresponding to the transmitted control message; and
 transmitting a generated response message, selected from among the generated multiple response messages, to the first device,
 wherein the generating the multiple response messages comprises generating the multiple response messages and selecting the one of the response messages from among the multiple response messages according to priorities given to the multiple response messages.

13. The method of claim 12, wherein the generating the multiple response messages comprise:
 storing device entities corresponding to the devices;
 selecting a device entity corresponding to the input control message from among the stored device entities and generating a response message based on the device entity which is selected;
 converting a response message to be transmitted between the first device and the second device.

14. The method of claim 13, wherein the device entity is a device class made in a Markup language based on information of the controlled device.

15. The method of claim 13, wherein the converting the response message comprises converting the input control message transmitted from the first device from a bit stream into a key/value pair including a key and a value, wherein the key indicates a function of the controlled device and the value indicates a status of the function.

16. The method of claim 15, wherein the generating the multiple response messages comprises generating a response message including a key/value pair corresponding to the input control message.

17. The method of claim 16, wherein the converting the response message comprises converting the generated response message into a bit stream.

18. The method of claim 15, wherein the generating the multiple response messages further comprises:
 generating a device entity based on the input control message if the device entity corresponding to the control message is not stored in the device entity storage module; and
 providing a graphical user interface through which a user can change the key and the value of a controlled device.

19. The method of claim 18, wherein the generating the device entity comprises:
 generating a new device entity through the key/value pair of the response message corresponding to the key/value pair of the control message and
 storing the generated device entity in a device entity storage module.

20. The method of claim 18, wherein the providing the graphical user interface comprises,
 when the key and the value of the controlled device are changed, transmitting a response message including a key and a changed value to the first device.

* * * * *